US007744373B2

(12) United States Patent
Williamson et al.

(10) Patent No.: US 7,744,373 B2
(45) Date of Patent: Jun. 29, 2010

(54) DISPERSION BURNER FOR FIREFIGHTER TRAINING

(75) Inventors: Steven J. Williamson, Wayne, NJ (US); Louis Orotelli, Colonia, NJ (US)

(73) Assignee: Kidde Fire Trainers, Inc., Montvale, NJ (US)

( * ) Notice: Subject to any disclaimer, the term of this patent is extended or adjusted under 35 U.S.C. 154(b) by 645 days.

(21) Appl. No.: 11/498,978

(22) Filed: Aug. 2, 2006

(65) Prior Publication Data

US 2008/0050706 A1 Feb. 28, 2008

(51) Int. Cl.
*G09B 19/00* (2006.01)

(52) U.S. Cl. ........................................ 434/226

(58) Field of Classification Search ................. 434/219, 434/226

See application file for complete search history.

(56) References Cited

U.S. PATENT DOCUMENTS 4,303,396 A * 12/1981 Swiatosz .................... 434/226
4,861,270 A 8/1989 Ernst et al.
4,983,124 A 1/1991 Ernst et al.
5,055,050 A 10/1991 Rogers et al.
5,233,869 A 8/1993 Rogers et al.
5,266,033 A 11/1993 Rogers et al.
5,316,484 A * 5/1994 Layton et al. ............... 434/226
5,320,536 A 6/1994 Rogers et al.
5,328,375 A 7/1994 Rogers et al.
5,335,559 A 8/1994 Rogers et al.
5,345,830 A 9/1994 Rogers et al.
5,374,191 A * 12/1994 Herman et al. .............. 434/226
5,411,397 A * 5/1995 Rogers et al. ............... 434/226
5,447,437 A 9/1995 Joynt et al.
5,509,807 A * 4/1996 Joice et al. .................. 434/226
5,688,136 A 11/1997 Rogers et al.
5,888,072 A * 3/1999 Musto et al. ................ 434/226
6,077,081 A 6/2000 Dunn
6,866,513 B2 3/2005 Hough
6,989,831 B2 1/2006 Ebersole et al.
7,008,230 B2 3/2006 Hoglund
7,175,439 B2 * 2/2007 Darois et al. ................ 434/226
2003/0198922 A1 * 10/2003 Musto et al. ................ 434/226
2006/0141429 A1 * 6/2006 Schutte et al. .............. 434/226

FOREIGN PATENT DOCUMENTS

WO WO 03/072201 A1 9/2003

OTHER PUBLICATIONS

European Search Report mailed Oct. 10, 2007.

* cited by examiner

*Primary Examiner*—Kurt Fernstrom
(74) *Attorney, Agent, or Firm*—Kinney & Lange, P.A.

(57) ABSTRACT

A firefighting trainer includes a tank for containing a volume of a non-combustible dispersion medium such as water. The water resides within the tank having an upper surface of the water exposed through an open upper end of the tank. A fuel distribution system distributes a combustible fuel into the tank beneath the water surface. An air distribution system distributes an oxygen containing gas (such as air) into the tank beneath the upper water surface. An ignition system ignites a mixture of a vapor of the fuel and the air at the upper surface of the water. A screen covers the open end of the tank and is spaced from the upper surface of the water. The screen has open spaces permitting passage of flame through the screen.

14 Claims, 1 Drawing Sheet

DISPERSION BURNER FOR FIREFIGHTER TRAINING

I. BACKGROUND OF THE INVENTION

1. Field of the Invention

This invention pertains to a dispersion burner design for firefighter training. More particularly, this invention pertains to a dispersion burner design having an enhanced realism and performance during training.

2. Description of the Prior Art

When training firefighters, simulated fire conditions are created to permit trainees to practice firefighting techniques. One type of apparatus for creating a simulated fire condition is a so-called water dispersion burner (also referred to as "water bath" burner).

Water dispersion burners create gas-fueled flame patterns for firefighter training systems. An example of such a water bath burner is shown in U.S. Pat. No. 5,055,050 to Rogers et al. issued Oct. 8, 1991. The firefighting trainer of the '050 patent includes a tank which contains water, gravel or other dispersion medium. A combustible fuel (such as propane or the like) is piped into the dispersion medium. The fuel vaporizes and percolates out of the dispersion medium and mixes with the atmosphere at the surface of the dispersion medium to form a combustible mixture. This mixture is ignited by a pilot flame creating a sustained flame at the surface of the dispersion medium. Firefighters can then practice firefighting techniques on the sustained flame.

Water bath burners such as those disclosed in the '050 patent have been generally acceptable for training firefighters. Such burners create a uniform flame pattern and yield a high heat output. However, they suffer from a few deficiencies. For example, the burner's water surface is exposed and visible to firefighting trainees. As a result, the simulation fire is a non-realistic representation of a fire which might be present on wood, paper, fabric or other Class A material.

Firefighting techniques include aiming a fire hose to direct water in a tight direct stream (referred to as a "direct stream attack pattern") at a fire. Such techniques also include sweeping the surface of the fire in a so-called hose line attack pattern.

During a direct stream attack pattern, water flow from the fire hose can result in rapid displacement of water from the tank of the water bath burner such as that of the '050 patent. This can adversely affect burner performance. Also, the flames produced in the water bath burner of the '050 patent can be swept away from the surface of the water burner during line attack patterns. This can result in non-combusted fuel being released into a training area atmosphere at a high rate creating a potential hazard.

II. SUMMARY OF THE INVENTION

According to preferred embodiment of the present invention, a firefighting trainer is disclosed which includes a tank for containing a volume of a non-combustible dispersion medium such as water. The water resides within the tank having an upper surface of the water exposed through an open upper end of the tank. A fuel distribution system distributes a combustible fuel into the tank beneath the water surface. An air distribution system distributes an oxygen containing gas (such as air) into the tank beneath the upper water surface. An ignition system ignites a mixture of a vapor of the fuel and the air at the upper surface of the water. Additional features of the invention include a screen covering the open end of the tank and spaced from the upper surface of the water. The screen has open spaces permitting passage of flame through the screen.

III. BRIEF DESCRIPTION OF THE DRAWINGS

IV. DESCRIPTION OF THE PREFERRED EMBODIMENT

Figure 2:
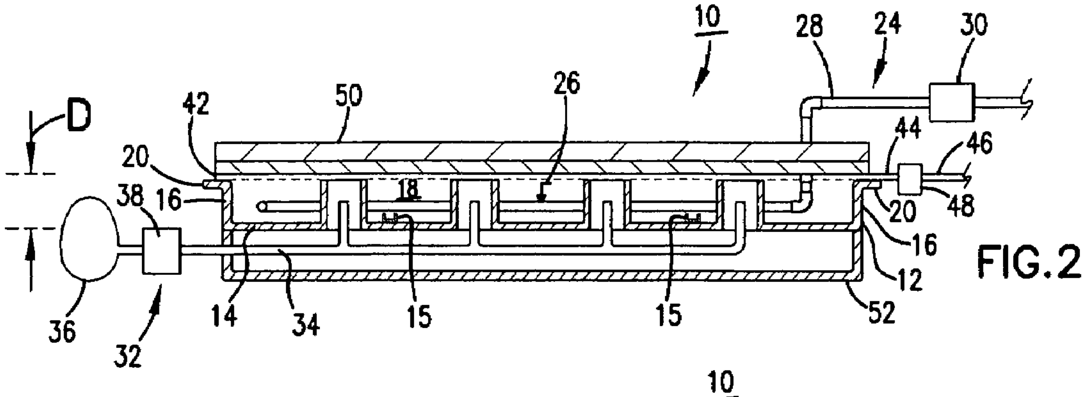
FIG. 2 is a side cross-sectional view of the apparatus of FIG. 1.
Figure 1:
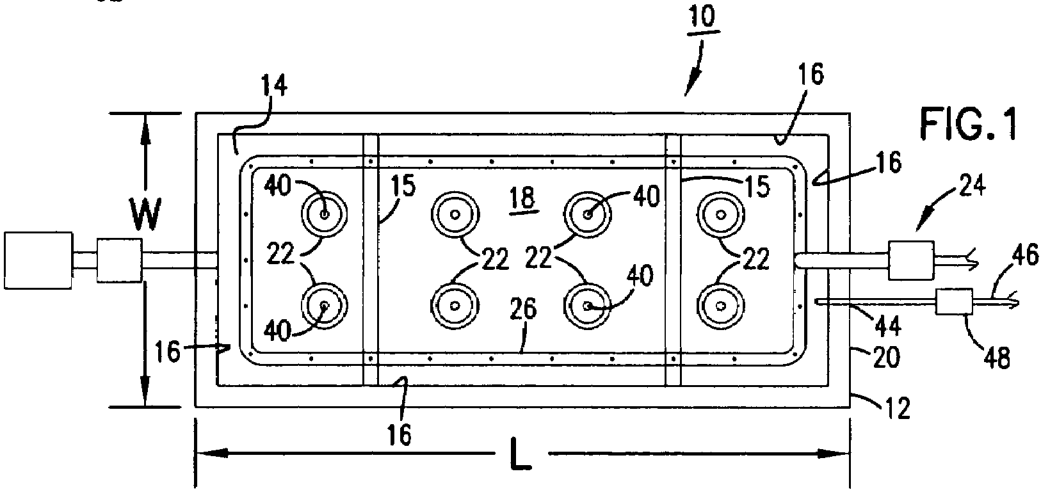
FIG. 1 is a top plan view of an apparatus according to the present invention with a screen and grating removed to reveal internal components.
Figure 3:
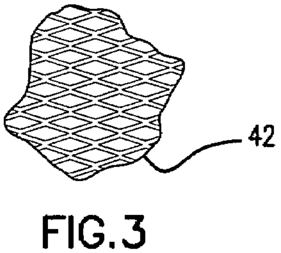
FIG. 3 is a top plan view of a portion of a screen for the apparatus of FIGS. 1 and 2.
Figure 4:
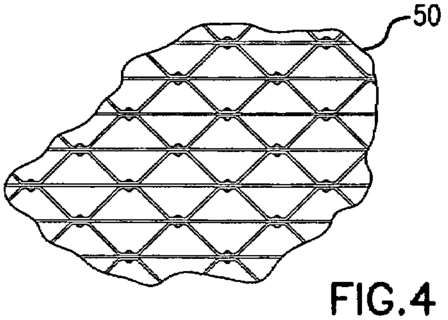
FIG. 4 is a top plan view of a portion of a grid for the apparatus of FIGS. 1 and 2.

With reference now to the various drawing figures in which identical elements are numbered identically throughout, a description of the preferred embodiment of the present invention will now be provided. The present invention is an improvement upon water bath burners such as those disclosed in U.S. Pat. No. 5,055,050 to Rogers et al. issued Oct. 8, 1991 and incorporated herein by reference.

The firefighting trainer according to the present invention is shown generally at 10. The trainer 10 includes a tank 12 having a floor 14 and vertical walls 16 defining an interior 18. Upper ends of the walls 16 may or may not include outward flanges 20. By way of non-limiting the example, the tank 12 can have a length L of about 6 feet and a width W of about 3 feet and a depth D of about four to six inches. The floor 14 and side walls 16 are reinforced by struts 15 welded across the bottom wall 14. The tank is preferably formed of non-combustible rigid material such as corrosion-resistant steel or the like.

A plurality of steel cylinders 22 are secured to the bottom wall 14 with each cylinder 22 arranged with its cylindrical axis vertically aligned and perpendicular to the floor 14. The height of the cylinders is preferably equal to the depth D of the tank 12 (i.e., about 4 inches high in the example) and terminate at a common plane with the optional flange 20 for reasons that will become apparent. In the example, the cylinders 22 have a diameter of about four inches.

The cylinders 22 are preferably spaced from the walls 16. As will become apparent, this allows combustion air to be provided to the core of the fire. In this rectangular tank example the cylinders 22 are bounded by the burner loop 26. If the tank 12 were round, the cylinders 22 would be centralized and the burner loop 26 would surround the cylinder pattern. It is important to note that the air can be provided to the core of the tank via non-cylindrical-shaped tubes. The size and specific pattern of such tubes is illustrative only and can vary.

The trainer 10 includes a fuel distribution system 24. The fuel distribution system 24 includes a fuel distribution piping 26 disposed within the tank 12 and beneath the upper plane defined by the cylinders 22 and flange 20.

The piping 26 surrounds an inside perimeter of the tank 12 near the floor 14. A resulting flame naturally fills in the center of the pattern.

Figure 5:
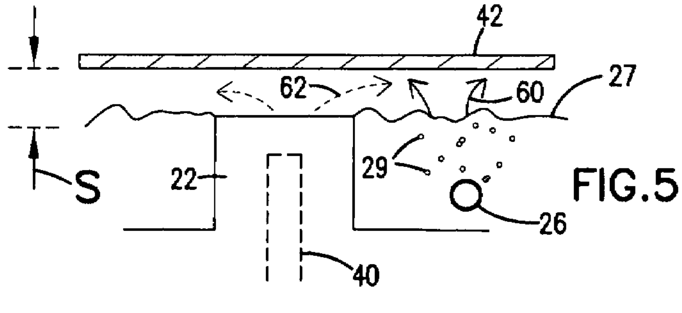
FIG. 5 is a partial side cross-sectional view of the apparatus of FIG. 1 showing gas and air flow to create a flame.

The piping 26 is perforated to discharge a fuel under pressure into water contained within the tank 12. If desired, the piping 26 can be fitted with nozzles (not shown) to discharge the fuel. When exited from the piping 26, the fuel diffuses through the water 27 (FIG. 5) as fuel vapor bubbles 29.

External piping 28 connects the internal piping 26 to a source (not shown) of combustible fuel. A valve 30 is provided to control delivery of pressurized fuel from the source to the interior piping 26. In a preferred embodiment, the fuel is pressurized propane or natural gas.

The invention also includes an air distribution system 32. The air distribution system includes an air plenum 34 connected to the output of a fan 36. A control valve 38 is provided in the plenum 34 to permit controlling the rate of flow of air from the fan 36 through the plenum 34. Alternatively, the air distribution system could use a dedicated combustion air blower that pressurizes the area directly under the burner tank 12. Sheet metal can extend to the floor forming a duct system. Instead of a valve 38, a variable speed drive and blower can be used to vary the airflow to the burner.

The fan 36 receives air from ambient air. The plenum includes nozzles 40 contained within the cylinders 22 for discharging air from the plenum 34 into the cylinders 22.

A pilot flame device 44 includes a pilot line 46 connected to a suitable gas supply (not shown) through a controller 48. The pilot flame device 44 is positioned to project a pilot flame at the plane of the cylinders 22.

A screen or mesh material 42 is provided resting on the flange 20 and spaced just above the plane defined by the cylinders 22 by a small spacing S (FIG. 5) such as 0.25 inches. The screen 42 is corrosion-resistant steel placed above the surface of the water in the tank 12. It has an approximate open area of 50%. Its purpose is to break up the high pressure direct stream hose attacks into smaller water drops.

A rigid grate 50 rests on the screen 42. The grating 50 is constructed of heavy steel stock with an approximate open area of 80%. The grating 50 keeps the screen 42 in place, allowing it to expand and contract during thermal cycling. The grating 50 also holds the weight of personnel who may walk on it after a fire training exercise. The grating 50 also forms a rigid flat plane simulating an upper surface of a specific fire training mockup.

In use, water is placed within the tank 12 with an upper level of the water defined by the plane of the cylinders 22. The cylinders 22 open through the tank floor 14 into a collection trough 52 to collect any water that spills over the top of the cylinders 22 into the interior of the cylinders 22. The collection trough 52 may direct the water to any suitable drain or the like (not shown) for disposal. Alternatively, a separate cylinder (not shown) can be provided with an upper end slightly lower (e.g., 0.25 inch) than cylinders 22. As a result, the water level can be lower than cylinders 22.

The control valve 30 is actuated to admit pressurized propane into the internal piping 26. Air is admitted into the cylinders 22.

Within the water, the fuel from the piping 26 is injected into the water through perforations of the piping with the injected fuel flashing into a vapor which diffuses through the water as propane vapor bubbles 29. At the surface, the fuel vapor 60 above the water surface 27 (FIG. 5) mixes with the air 62 from the cylinders 22 to form a combustible mixture. The air-fuel mixture is ignited by the pilot flame from pilot 44. The ignition creates a flame 70 which passes through the screen 42 and grate 50.

Firefighters in training approach the apparatus 10 with fire hoses and the like. As they approach, they see the flame above the screen 42 but, by reason of the obstruction of the screen 42, do not see the water surface. As a result, the resulting flame is a more realistic representation of burning class A material (such as wood, paper, fabric, etc.).

In the event the firefighter trainees use direct stream hose attacks on the flame, the screen 42 prevents the water from the fire hose displacing the water in the tank 12. Further, any water that is admitted to the tank 12 from the hose spills over the cylinders 22 and is collected by the collection system 52. Also, in the event the firefighter trainees apply water from a hose in a sweeping pattern the flame is not pushed off the water surface 27. Instead, the surface of the water at which combustion is occurring is protected by the screen 42.

It has been shown how the present invention has been attained in the preferred embodiment. Modification and equivalents of the disclosed concepts are intended to be included within the scope of the claims which are appended hereto.

We claim:

1. A fire fighting trainer comprising:

a tank for containing a volume of a non-combustible medium with the non-combustible medium having an upper surface within the tank;

the tank having an open upper end exposing the upper surface;

a fuel distribution system for distributing a combustible fuel into the tank beneath the upper surface, the fuel distribution system including a plurality of fuel outlets within the tank;

an oxygen-containing gas distribution system for distributing an oxygen-containing gas into the tank, the oxygen-containing gas distribution system including a plurality of gas outlets within the tank, the gas outlets being positioned to deliver the oxygen-containing gas at a surface of the non-combustible medium in a core area of the tank surrounded by the fuel outlets of the fuel distribution system;

an ignition system for igniting a mixture of a vapor of the fuel and the oxygen-containing gas at the upper surface for said mixture to ignite into flame.

2. A fire fighting trainer according to claim 1 further comprising a mesh material covering the open upper end of the tank at a level spaced upwardly from the upper surface, the mesh material having open spaces permitting passage of the flame through the mesh material.

3. A fire fighting trainer according to claim 1 wherein the non-combustible medium is water.

4. A fire fighting trainer according to claim 3 further comprising an overflow control for limiting a maximum level of the water with the tank.

5. A fire fighting trainer according to claim 1 wherein the fuel distribution system includes a piping system within the tank for distributing combustible fuel into the medium and ejecting the fuel from the piping into the medium with the fuel forming a vapor distributed at the upper surface.

6. A fire fighting system according to claim 1 wherein the oxygen-containing gas distribution system includes a plurality of tubes disposed within the tank and extending from a bottom of the tank upward toward the upper surface and connected to a source of air for admitting air into the tubes for distribution of air at the upper surface to mix with fuel at the upper surface in a core of the flame.

7. A fire fighting system according to claim 6 wherein the tubes terminate at upper ends defining a plane at the upper surface for water within the tank to spill into the tubes as the water exceeds the upper surface.

8. A fire fighting trainer comprising:

a tank for containing a volume of a non-combustible medium with the non-combustible medium having an upper surface within the tank;

the tank having an open upper end exposing the upper surface;

a fuel distribution system for distributing a combustible fuel into the tank beneath the upper surface;

an oxygen-containing gas distribution system for distributing an oxygen-containing gas into the tank at a core area surrounded by the fuel distribution system within the tank, so that oxygen-containing gas is supplied at the upper surface of the non-combustible medium for combustion with the fuel;

an ignition system for igniting a mixture of a vapor of the fuel and the oxygen-containing gas at the upper surface for said mixture to ignite into a flame;

a mesh material covering the open upper end of the tank at a level spaced upwardly from the upper surface, the mesh material having open spaces permitting passage of the flame through the mesh material.

9. A fire fighting trainer according to claim 8 wherein the non-combustible medium is water.

10. A fire fighting trainer according to claim 9 further comprising an overflow control for limiting a maximum level of the water with the tank.

11. A fire fighting trainer according to claim 8 wherein the fuel distribution system includes a piping system within the tank for distributing combustible fuel into the medium and ejecting the fuel from the piping into the medium with the fuel forming a vapor distributed at the upper surface.

12. A fire fighting system according to claim 8 wherein the oxygen-containing gas distribution system includes a plurality of tubes disposed within the tank and extending from a bottom of the tank upward toward the upper surface and connected to a source of air for admitting air into the tubes for distribution of air at the upper surface to mix with fuel at the upper surface in a core of the flame.

13. A fire fighting system according to claim 12 wherein the tubes terminate at upper ends defining a plane at the upper surface for water within the tank to spill into the tubes as the water exceeds the upper surface.

14. A fire fighting trainer comprising:

a tank for containing a volume of water with the water having an upper surface within the tank;

the tank having an open upper end exposing the upper surface;

a fuel distribution system for distributing a combustible fuel into the tank beneath the upper surface, wherein the fuel distribution system includes a piping system including a plurality of outlets within the tank for distributing combustible fuel into the water and ejecting the fuel from the piping into the water with the fuel forming a vapor distributed at the upper surface;

an oxygen-containing gas distribution system for distributing an oxygen-containing gas into the tank, wherein the oxygen-containing gas distribution system includes a plurality of vertical tubes disposed within the tank in a core area surrounded by the piping system and extending from a bottom of the tank upward toward the upper surface and connected to a source of air for admitting air into the tubes for distribution of air at the upper surface to mix with fuel at the upper surface, wherein the tubes terminate at upper ends defining a plane at the upper surface for water within the tank to spill into the tubes as the water exceeds the upper surface to form an overflow control system, the overflow control system including a collection trough;

an ignition system for igniting a mixture of a vapor of the fuel and the oxygen-containing gas at the upper surface for said mixture to ignite into a flame;

a mesh material covering the open upper end of the tank at a level spaced upwardly from the upper surface, the mesh material having open spaces permitting passage of the flame through the mesh material.

* * * * *